Aug. 24, 1965 A. J. WEINSTEIN 3,202,813
LIGHT TABLE

Filed Dec. 20, 1962 3 Sheets-Sheet 1

INVENTOR.
ALEX J. WEINSTEIN
BY
*Raymond A. Paquin*
ATTORNEY.

INVENTOR.
ALEX J. WEINSTEIN
BY
ATTORNEY.

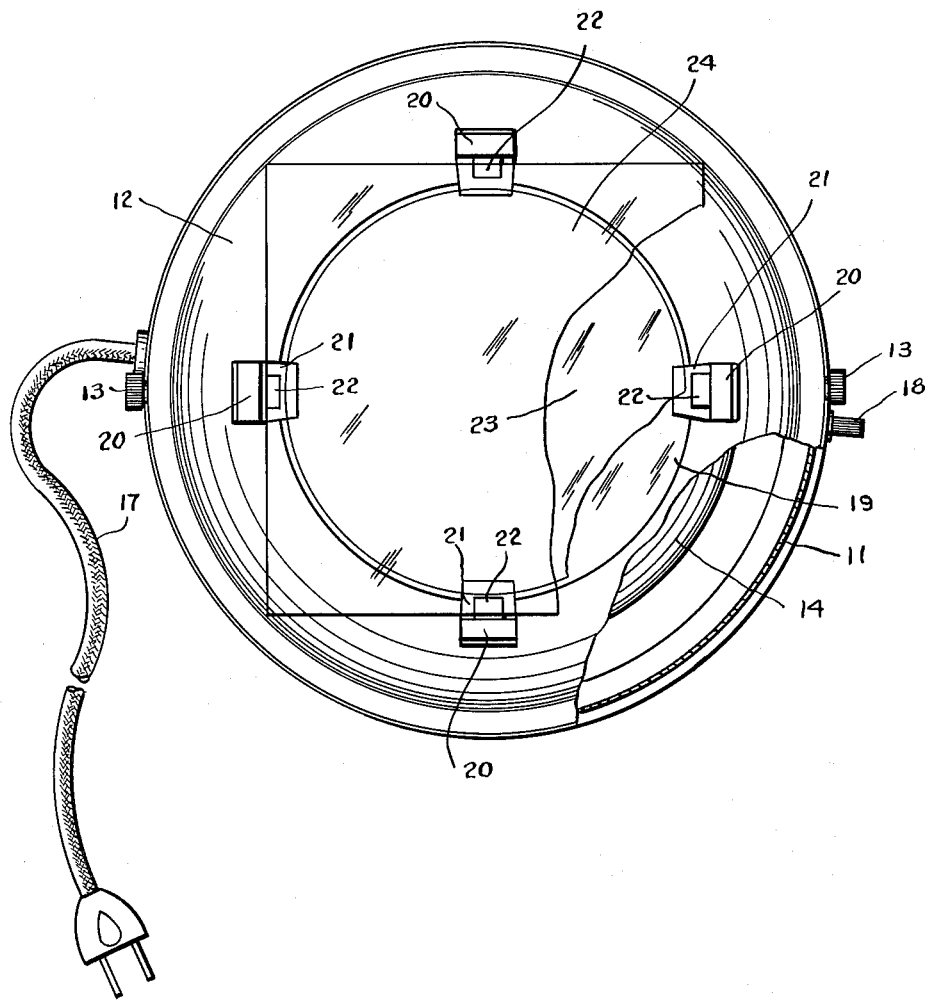

United States Patent Office 3,202,813
Patented Aug. 24, 1965

3,202,813
LIGHT TABLE
Alex J. Weinstein, Mount Vernon, N.Y., assignor, by mesne assignments, to The Edna Lite Corporation, Peekskill, N.Y., a corporation of New York
Filed Dec. 20, 1962, Ser. No. 246,075
2 Claims. (Cl. 240—2)

This invention relates to light tables or base illuminators of the type used to illuminate, for viewing purposes, objects such as specimens or the like which are positioned above or upon said base illuminators and has particular reference to the provision of a new and improved light table or base illuminator including new and improved means for supporting the objects to be viewed with or without the use of contrast illumination filters.

An object of the invention is to provide a new and improved light table or base illuminator of the type described which includes new and improved means for maintaining the specimen supporting stage and/or contrast illumination filters in viewing position.

Another object of the invention is to provide a new and improved light table or base illuminator of the type described which is both simple and economical in construction and efficient in operation.

Other objects and advantages of the invention will be apparent from the foregoing description taken in connection with the accompanying drawings. It will be understood that changes may be made in the details of construction and arrangement of parts shown and described as the preferred form of the invention has been given by way of illustration only.

Referring to the drawings:

FIG. 3 is a top view of the form of light table shown in FIGS. 1 and 2 with a portion of the housing cut away.

Figure 1:
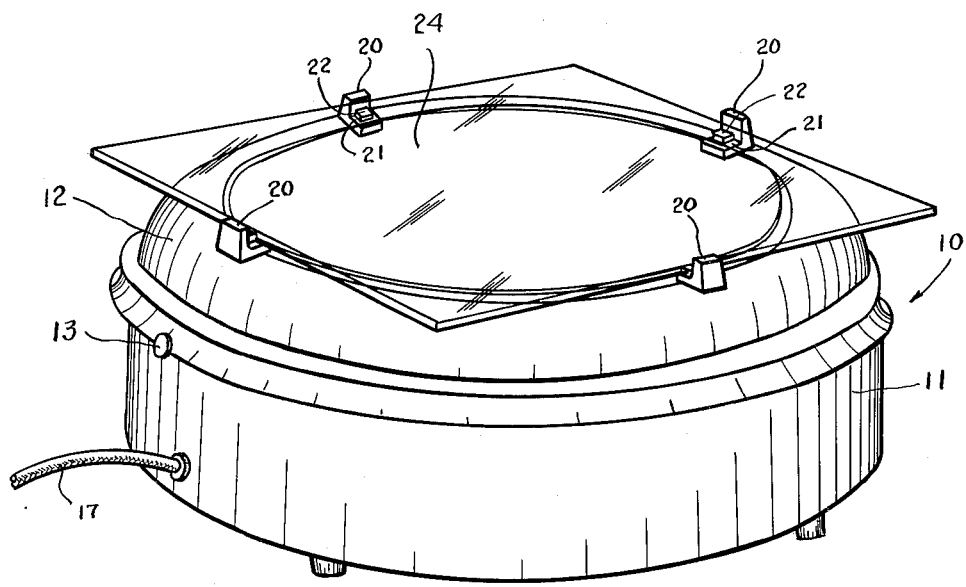
FIG. 1 is a view in perspective of a light table constructed in accordance with the invention.
Figure 2:
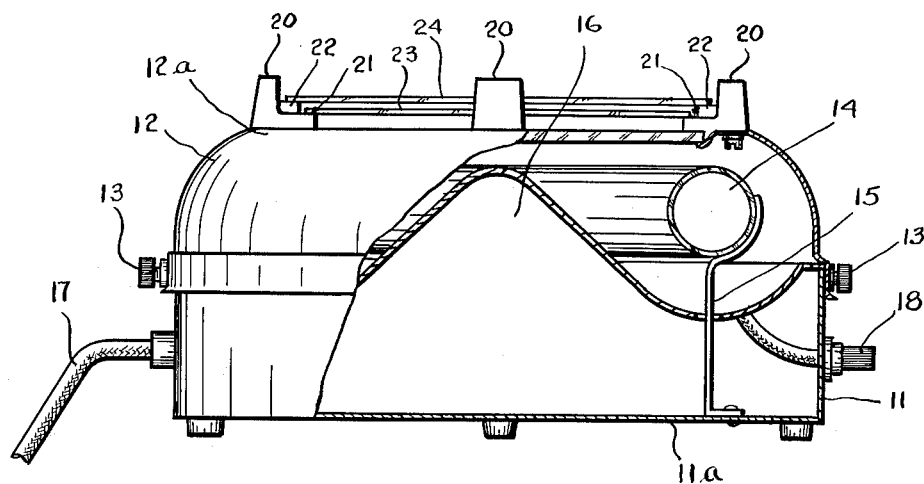
FIG. 2 is a side view of the form of light shown in FIG. 1 with a portion of the outside housing cut away.

Referring more particularly to the drawings wherein similar reference characters designate corresponding parts throughout, the light table shown comprises a housing 10 comprised of the base 11 and the cover 12 secured in closed relation to one another by securing means such as screws 13.

A ring shaped light source 14 is supported within housing 10 by means of supporting members 15 connected to the bottom wall 11a of base 11. An ellipsoidtoroid reflector 16 is positioned in base 11 and has a portion beneath ring shaped light source 14 and a raised central projection within the ring formed by said light source to provide uniform illumination through diffusing plate 19 in cover 12 and, thereby, evenly illuminate the specimen under observation.

Lead 17 serves to connect light source 14 to an appropriate power source; while switch 18 controls the operation of said light source.

Cover 12 of housing 10 includes a preferably circular diffusing plate 19 in its upper side or surface 12a. Directly adjacent the periphery of diffusing plate 19 is positioned support means 20.

Support means 20 are each comprised of a lower step or portion 21 and an upper step or portion 22 in the illustrated embodiment of the invention. However, additional steps could be provided, if desired. The lower steps 21 serve to maintain contrast illumination filters or other light modifying means 23 in position over the diffusing plate 19. Through the use of the contrast illumination filter 23, the light emitted from the light table through diffusing plate 19 may be caused to be of any desired color and may even be eliminated through the use of filters producing a total black background. Hence, any desired background may, thus, be created for work on a specimen positioned above the filter 23.

Upper steps 22 of support means 20 serve to maintain removable glass slides or specimen holders 24 in position over the diffusing plate 19 and the contrast illumination filter 23, should such a filter 23 be used.

The glass slides 24 serve to support the specimen to be viewed in viewing position upon the light table. The slides may be conventional interchangeable clear glass slides or other suitable stages.

In operation, lead 17 is connected to any convenient appropriate power source. Contrast illumination filters 23 producing the desired viewing background are positioned upon the lower steps 21 of the step supports 20 directly over the diffusing plate 19 of the light table. Should an uncolored viewing background be desired, no filters are used.

The glass slide 24 upon which the specimen to be viewed has been positioned in then placed upon the upper steps 22 of the step supports 20 directly over the diffusing plate 19.

Ring shaped light source 14 is then turned on by means of the switch 18; and the light table is ready for use.

If, during the use of the light table, it is desired that a different specimen be viewed or that a different colored background be used for viewing, the viewer has merely to remove the glass slide 24 upon which the specimen being viewed has been placed and either replace it with another, should he desire to change the specimen on view, or replace the contrast illumination filter 23 in use with another capable of producing the desired background, should he desire to vary the viewing background.

Thus, it will be seen that I have provided new and improved means for accomplishing all of the objects and advantages of the invention.

I claim:

1. In a device of the described character, the combination of a housing having a light transmitting plate at the top thereof, a light source within said housing reflecting means in said housing for effecting substantially uniform illumination of said plate from said light source, and a plurality of support members mounted on said top of the housing at spaced apart locations adjacent the periphery of said light transmitting plate, each of said support members being stepped upwardly in the direction away from said plate to define upwardly facing support surfaces at different levels and at different distances from said periphery of the plate for supporting interchangeable superposed filters and specimen bearing glass stages above said light transmitting plate.

2. In a device of the described character, the combination as in claim 1; wherein said light transmitting plate is circular and said support members are equally spaced around the circular periphery of said plate.

References Cited by the Examiner

UNITED STATES PATENTS

| | | | |
|---|---|---|---|
| 1,887,288 | 11/32 | Clausen | 240—20 X |
| 1,929,846 | 10/33 | Mason | 240—20 |
| 2,051,466 | 8/36 | Brown | 240—46 X |
| 2,255,319 | 9/41 | Kanter | 88—24 |
| 2,349,853 | 5/44 | Ebert | 240—46.59 |
| 2,415,635 | 2/47 | Hopkins. | |
| 2,827,554 | 5/58 | Gunther | 240—3.1 X |
| 2,878,372 | 3/59 | Fry | 240—51.12 |

FOREIGN PATENTS 840,533   6/52   Germany.

NORTON ANSHER, *Primary Examiner.*